(12) United States Patent
Heu (10) Patent No.: US 7,869,144 B2
(45) Date of Patent: Jan. 11, 2011

(54) LENS OPTICAL SYSTEM

(75) Inventor: Min Heu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/499,190

(22) Filed: Jul. 8, 2009

(65) Prior Publication Data
US 2010/0020420 A1   Jan. 28, 2010

(30) Foreign Application Priority Data
Jul. 22, 2008   (KR) .................. 10-2008-0071229

(51) Int. Cl.
*G02B 9/08* (2006.01)
*G02B 9/12* (2006.01)

(52) U.S. Cl. ...................................... 359/794; 359/784
(58) Field of Classification Search ................. 359/784, 359/786–788, 794
See application file for complete search history.

(56) References Cited

U.S. PATENT DOCUMENTS 7,777,974 B2 *   8/2010   Yamamoto .................. 359/791

* cited by examiner

*Primary Examiner*—William C Choi
(74) *Attorney, Agent, or Firm*—Drinker Biddle & Reath LLP (57) ABSTRACT

Provided is a lens optical system, which includes (from object to image side) a first lens group having positive refractive power, a stop, and a second lens group having positive refractive power. The first lens group comprises a plurality of lenses among which there are a lens closest to the object side and a lens closest to the stop having negative refractive powers. The second lens group includes a front group and a rear group.

13 Claims, 7 Drawing Sheets

LENS OPTICAL SYSTEM

CROSS-REFERENCE TO RELATED PATENT APPLICATION

This application claims the benefit of Korean Patent Application No. 10-2008-0071229, filed on Jul. 22, 2008, in the Korean Intellectual Property Office, the disclosure of which is incorporated herein in its entirety by reference.

BACKGROUND OF THE INVENTION

1. Field of the Invention

The present invention relates to a large aperture lens optical system.

2. Description of the Related Art

Recently, the demand for single lens reflex cameras has significantly increased. Much attention has been paid to digital single lens reflex cameras employing an image sensor, such as a charge coupled device (CCD) or a complementary metal-oxide semiconductor (CMOS), instead of film cameras. Digital single lens reflex cameras are highly pixelized according to the demand of users and the development of image sensor technology. Thus, an interchangeable lens used in digital single lens reflex cameras needs to have excellent optical performance.

A single lens reflex camera includes a reflective mirror which bends the light path by 90 degrees before photographing so that a user can recognize a viewing angle through a view finder and moves upwards by 45 degrees during photographing so that light directly reaches an imaging device without contacting the reflective mirror. Due to these characteristics of the single lens reflex camera, an interchangeable lens needs to have a long back focal distance in order not to intersect the path of the reflective mirror. A double Gauss type optical system is widely used in order to manufacture a standard short focus lens having a long back focal distance and a viewing angle of about 40 to 50 degrees.

By using the double Gauss type optical system, longitudinal spherical aberration, which is the most serious problem in a large aperture lens system, can be efficiently reduced, and a long back focal distance that is essential for the single lens reflex camera can be secured. In addition, a large sagittal coma aberration, which is the most serious problem of the double Gauss type optical system, can be corrected by using a material having a high refractive index and employing an aspherical lens. However, the double Gauss type optical system does not provide sufficiently high optical performance required for the highly pixelized digital single lens reflex camera.

In addition, according to the double Gauss type optical system, the entire lens group moves in order to correct the image plane movement in accordance with a change in the distance from the object. However, when the method of correcting image plane movement is used in a large aperture lens having an aperture ratio of 1:1.2-1.5, longitudinal spherical aberration is significantly changed as the distance from the object is changed from infinity to a short distance, and thus it is difficult to secure an excellent optical performance in the entire range of distance from the object.

SUMMARY OF THE INVENTION

The present invention provides a lens optical system, which has the excellent optical performance required for a digital single lens reflex camera and the excellent image formation performance over the entire range of distance from an object. The lens optical system includes a large aperture lens having an excellent aberration correction performance.

According to an aspect of the present invention, there is provided a lens optical system including, in a sequence from an object side to an image side, a first lens group having positive refractive power, a stop, and a second lens group having positive refractive power, wherein the first lens group includes a plurality of lenses among which a lens closest to the object side and a lens closest to the stop have negative refractive powers, and the second lens group includes a front group including, in a sequence from the object side to the image side, a lens having negative refractive power and a plurality of lenses having positive refractive powers; and a rear group including at least one lens close to the image side.

The lens optical system may satisfy the following inequality:

$$1.2 < \frac{f_{all}}{b.f} < 1.6 \qquad (1)$$

wherein $f_{all}$ denotes an overall focal distance of the lens optical system, and b.f denotes a back focal distance when the distance from the object is infinity.

The lens closest to the object side and the lens closest to the image side of the first lens group may have negative refractive power, and at least two lenses having positive refractive power may be arranged between the lens closest to the object side and the lens closest to the image side of the first lens group, wherein at least one of the two lenses having positive refractive powers satisfies the following inequality:

$$1.80 < NGr1 \qquad (2)$$

wherein NGr1 denotes a refractive index of a lens having positive refractive power in the first lens group based on a d-line.

An interval between the front group and the rear group of the second lens group may be changed while focusing is performed in accordance with a change in the distance from the object.

The rear group of the second lens group may be fixed with respect to the image side while focusing is performed.

The interval between the first lens group and the front group of the second lens group may be fixed while focusing is performed.

The rear group of the second lens group may satisfy the following inequality:

$$1 < \frac{f_{2-2}}{f_{all}} < 10 \qquad (3)$$

wherein $f_{2-2}$ denotes a combined focal distance of the rear group of the second lens group, and $f_{all}$ denotes an overall focal distance of the lens optical system.

The front group of the second lens group may include at least one aspherical surface.

The rear group of the second lens group may have positive refractive power.

The lens optical system may have an aperture ratio equal to or less than 1:1.5.

The first lens group may include 5 or less lenses.

BRIEF DESCRIPTION OF THE DRAWINGS

The above and other features and advantages of the present invention will become more apparent by describing in detail exemplary embodiments thereof with reference to the attached drawings in which:

FIGS. 3 (a)-(b) illustrate a focusing operation of the lens optical system according to the first embodiment of the present invention;

DETAILED DESCRIPTION OF THE INVENTION

Hereinafter, the present invention will be described more fully with reference to the accompanying drawings, in which exemplary embodiments of the invention are shown.

Figure 1:
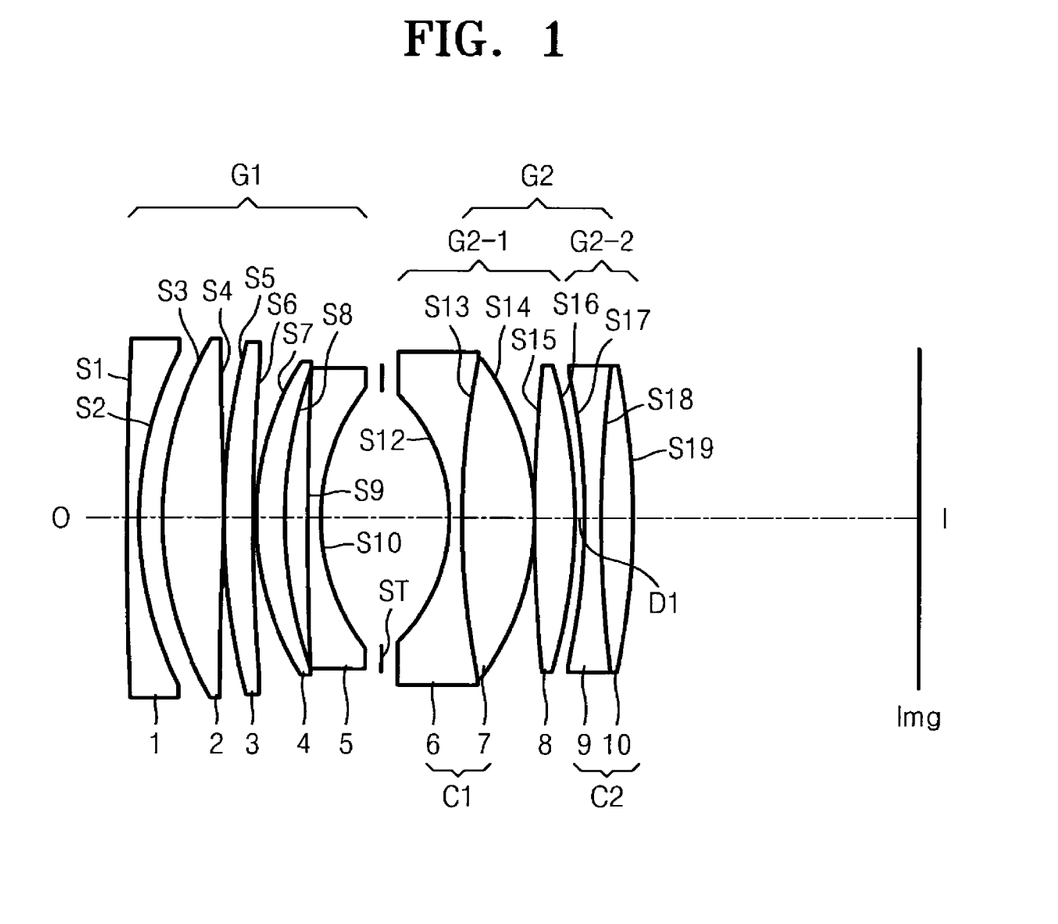
FIG. 1 illustrates a lens optical system according to a first embodiment of the present invention.

FIG. 1 illustrates a lens optical system according to a first embodiment of the present invention;

Referring to FIG. 1, the lens optical system according to the first embodiment of the present invention includes, in a sequence from an object side O to an image side I, a first lens group G1 having positive refractive power, a stop ST, and a second lens group G2 having positive refractive power.

The first lens group G1 includes a plurality of lenses among which there are a lens closest to the object side O and a lens closest to the stop ST having negative refractive powers. For example, the first lens group G1 may include 5 or less lenses.

The first lens 1 that is closest to the object side O among the lenses of the first lens group G1 may be a meniscus-type concave lens. 2-3 lenses having positive refractive power may be arranged between the lens closest to the object side O and the lens closest to the stop ST. The lens optical system according to the present invention may have a longer back focal distance than with a conventional double Gauss type optical system by arranging the first lens 1 having negative refractive power closest to the object side O. Then, longitudinal spherical aberration may be efficiently corrected by increasing refractive power of the lenses that are arranged between the first lens 1 and the stop ST, and thus, distortion may also be corrected.

According to the first embodiment illustrated in FIG. 1, the first lens group G1 includes first through fifth lenses 1, 2, 3, 4, and 5. Differently, according to a second embodiment of the present invention illustrated in FIG. 4, a first lens group G1 includes first through fifth lenses 11, 12, 13, 14, and 15. According to a third embodiment of the present invention illustrated in FIG. 6, a first lens group G1 includes first through fourth lenses 21, 22, 23, and 24.

Referring to FIG. 1, the second lens group G2 includes a front group G2-1 and a rear group G2-2. The front group G2-1 includes, in a sequence from the stop ST to the image side I, a lens having negative refractive power and a plurality of lenses respectively having positive refractive powers. The rear group G2-2 includes at least one lens close to the image side I. Chromatic aberration may be efficiently corrected in the front group G2-1 by using a doublet lens formed of the lens having negative refractive power and the lens having positive refractive power.

For example, the front group G2-1 may include, in a sequence from the object side O to the image side I, a sixth lens 6 having negative refractive power and a plurality of lenses 7 and 8 respectively having positive refractive powers. The lenses 7 and 8 having positive refractive power may be two separate lens of seventh lens 7 and eighth lens 8. The sixth lens 6 and the seventh lens 7 may be constituted as a doublet lens C1. A front group G2-1 of a second lens group G2 of a lens optical system according to the second embodiment of the present invention illustrated in FIG. 4 may include a fifth lens 15 having negative refractive power and a sixth lens 16 and a seventh lens 17 respectively having positive refractive powers. A front group G2-1 of a second lens group G2 of a lens optical system according to the third embodiment of the present invention illustrated in FIG. 6 may include a fifth lens 25 having negative refractive power and a sixth lens 26 and a seventh lens 27 respectively having positive refractive powers. Since the front groups G2-1 of the second lens groups include a doublet lens and a lens having positive refractive power, a balanced aberration correction may be performed.

Figure 4:
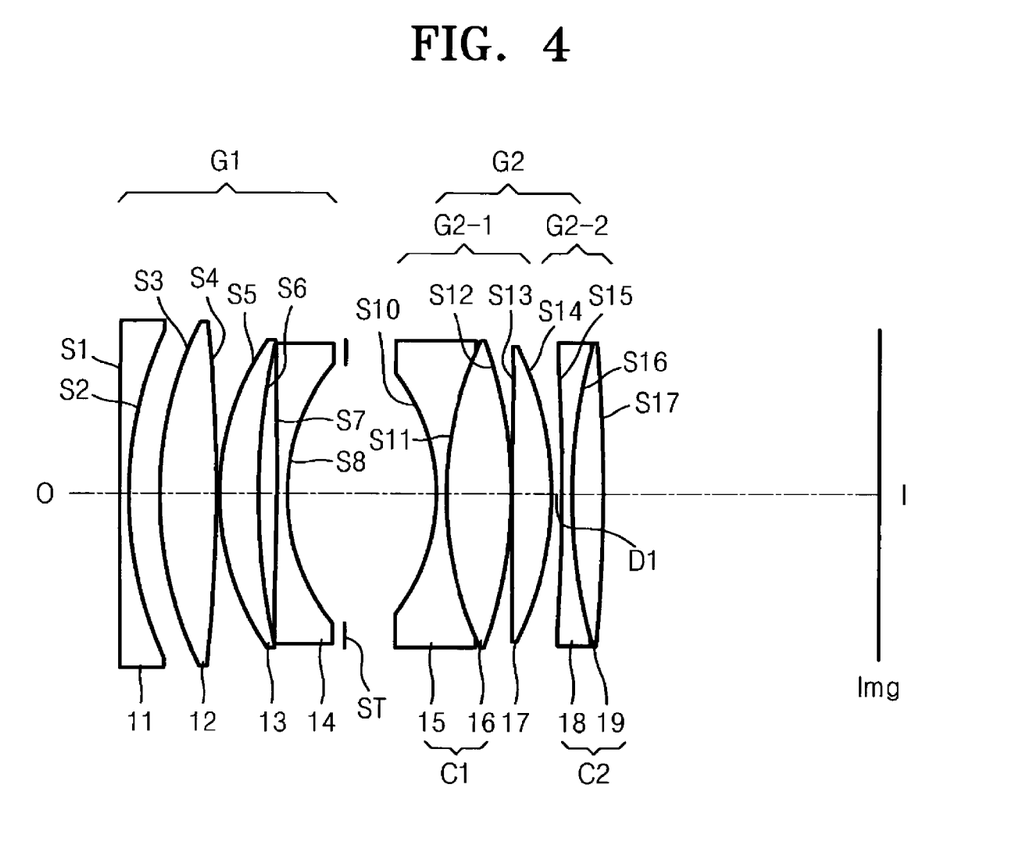
FIG. 4 illustrates a lens optical system according to a second embodiment of the present invention.
Figure 6:
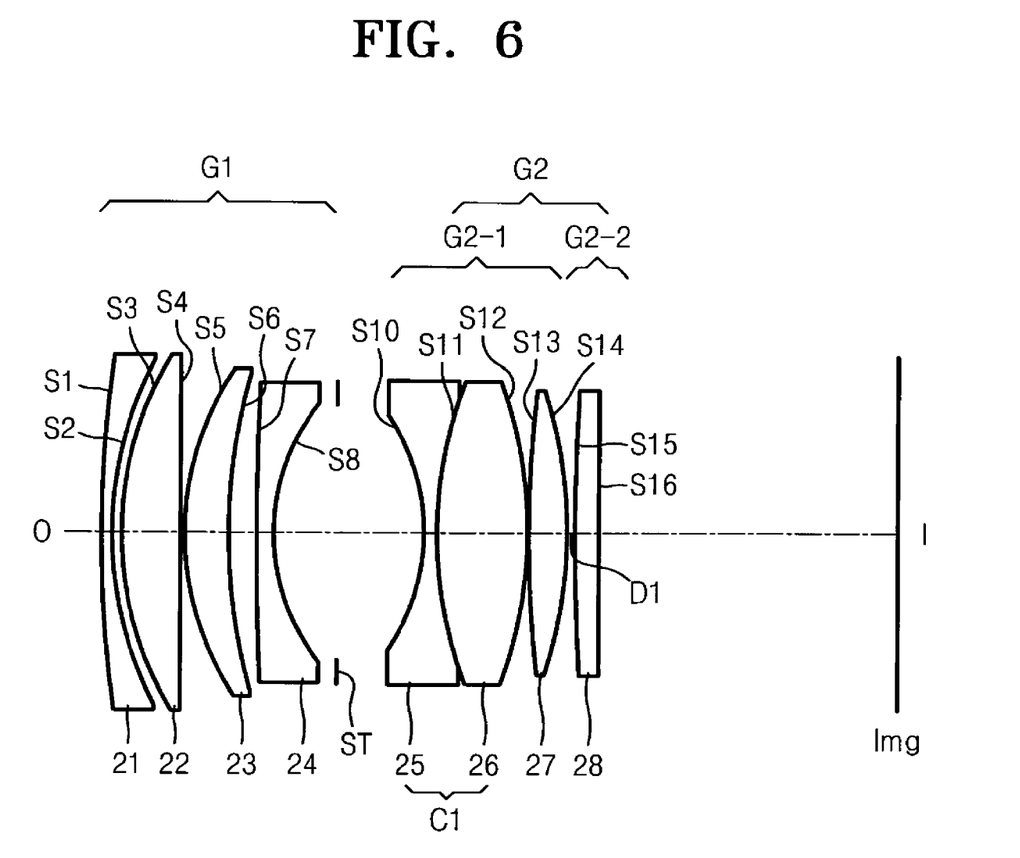
FIG. 6 illustrates a lens optical system according to a third embodiment of the present invention.

The rear group G2-2 of the second lens group G2 includes at least one lens. For example, the rear group G2-2 of the first embodiment and a rear group G2-2 of the second embodiment of the present invention respectively include two lenses 9 and 10, and 18 and 19. A rear group G2-2 of the second lens group G2 of the third embodiment of the present invention includes a single lens 28. If the rear group G2-2 includes two lenses, the two lenses may be manufactured as a doublet lens C2. Meanwhile, the rear group G2-2 of the second lens group G2 reduces a Petzval sum to decrease astigmatic field curvature, and may have positive refractive power or negative refractive power. If the rear group G2-2 of the second lens group G2 has positive refractive power, the front group G2-1 has a margin to distribute its refractive power appropriately.

According to the embodiments of the present invention, a lens having negative refractive power is arranged closest to the object side O in order to obtain a standard lens having a large aperture and an excellent optical performance. Thus, the lens optical system secures a sufficient back focal distance and corrects longitudinal spherical aberration to have an aperture ratio of equal to or less than 1:1.5. For example, brightness having an aperture ratio of 1:1.2~1.5 may be obtained. As a result, a standard lens available in a dark environment may be obtained.

In addition, the lens optical system according to the embodiments of the present invention may include at least one aspherical surface to correct longitudinal spherical aberration. The aspherical surface may be positioned on a lens having a large curvature radius in order to efficiently correct longitudinal spherical aberration. For example, the front group G2-1 of the second lens group G2 may include at least one aspherical surface.

Meanwhile, when the distance from the object is changed from infinity to a short distance, focusing is performed for correction of an image plane position. An interval between the front group G2-1 and the rear group G2-2 of the second lens group is changed to perform focusing. While the focusing is performed, the interval between the first lens group G1 and the front group G2-1 of the second lens group G2 is not changed, and the first lens group G1 and the front group G2-1 of the second lens group G2 move with respect to the image side I at the same time. The rear group G2-2 of the second lens group is fixed with respect to the image side I while focusing is performed. Thus, the performance variation of the lens optical system according to the distance from the object may be minimized and the design of the lens optical system may be simple.

The lens optical system according to the embodiments of the present invention may satisfy the following inequality.

$$1.2 < \frac{f_{all}}{b.f} < 1.6 \qquad (1)$$

In this regard, $f_{all}$ denotes an overall focal distance of the lens optical system, and b.f denotes a back focal distance when the distance from the object is infinity. Inequality 1 represents a ratio of the overall focal distance of the lens optical system to the back focal distance. If the ratio is greater than 1.6, a back focal distance required for a single lens reflex camera may not be secured, and thus it is difficult to form a camera or a sufficient viewing angle as a standard lens may not be secured since the focal distance is increased. On the other hand, if the ratio is less than 1.2, the back focal distance may be so large that the viewing angle is increased, and thus it is difficult to obtain a good optical performance.

Meanwhile, in the first lens group G1 according to the embodiments of the present invention, the lens closest to the object side O and the lens closest to the image side I have negative refractive powers. At least 2 lenses having positive refractive powers may be arranged between the lens closest to the object side O and the lens closest to the image side I, and at least one of the 2 lenses having positive refractive powers may satisfy the following inequality.

$$1.80 < NGr1 \qquad (2)$$

In this regard, NGr1 denotes a refractive index of a lens having positive refractive power in the first lens group G1 based on a d-line. Since Inequality 2 represents a refractive index of a lens having positive refractive power in the first lens group, a material having a high refractive index may be used for the lens having positive refractive power to correct chromatic aberration and the Petzval sum may be reduced to minimize astigmatic field curvature aberration.

In addition, the rear group G2-2 of the second lens group G2 may satisfy the following inequality.

$$1 < \frac{f_{2-2}}{f_{all}} < 10 \qquad (3)$$

In this regard, $f_{2-2}$ denotes a combined focal distance of the rear group G2-2 of the second lens group G2, and $f_{all}$ denotes an overall focal distance of the lens optical system. Inequality 3 represents a ratio of the focal distance of the rear group G2-2 of the second lens group G2 to the overall focal distance of the lens optical system. Accordingly, the change of spherical aberration may be reduced while focusing is performed in order to correct the image plane position in accordance with a change in the distance from the object from infinity to the short distance. If the ratio of $f_{2-2}/f_{all}$ is greater than 10, the refractive power of the rear group G2-2 of the second lens group G2 is so low that the spherical aberration may not be sufficiently corrected in the entire range of the distance from the object. If the ratio of $f_{2-2}/f_{all}$ is less than 1, the balance of the refractive power distribution in the entire lens optical system is not maintained, and thus it is difficult to secure an excellent optical performance in the entire range of the distance from the object when the distance from the object is changed.

Meanwhile, the term "aspherical surface" stated in the embodiments of the present invention is defined as follows.

When a direction of an optical axis is set as an x-axis and a direction perpendicular to the optical axis direction is set as a y-axis, a proceeding direction of a light beam is set as forward, an aspherical shape of a lens according to the present invention may be expressed as the following equation.

$$x = \frac{cy^2}{1 + \sqrt{1 - (K+1)c^2h^2}} + Ah^4 + Bh^6 + Ch^8 + Dh^{10} \qquad (4)$$

In this regard, x denotes a distance from an apex of the lens along the optical axis direction, y denotes a distance from the apex of the lens along the direction perpendicular to the optical axis direction, K denotes a conic constant, A, B, C, and D denote aspherical coefficients, and c denotes a reciprocal (1/R) of the radius of curvature of the apex of the lens.

Detailed data about lenses used in lens optical systems according to the first through third embodiments of the present invention will now be described. Hereinafter, f is referred to as a focal distance of the entire lens system, Fno is referred to as the F number, 2ω is referred to as a viewing angle, R is referred to as the radius of curvature, D is referred to as a center thickness of a lens or an interval between lenses, Nd is referred to as a refractive index, Vd is referred to as an Abbe number, ST is referred to as a stop, Img is referred to as an image plane, and ASP is referred to as an aspherical surface.

First Embodiment

FIG. 1 illustrates the lens optical system according to the first embodiment of the present invention. The following design data corresponds to the lens optical system according to the first embodiment of the present invention.

| f; 51.48 Fno; 1.20 2ω; 46.4° | | | | |
|---|---|---|---|---|
| Lens side | R | Dn | Nd | Vd |
| S1 | 1000.00 | 1.50 | 1.80518 | 25.46 |
| S2 | 48.308 | 3.14 | | |
| S3 | 45.900 | 8.07 | 1.83400 | 37.34 |
| S4 | −750.812 | 0.20 | | |
| S5 | 83.356 | 4.30 | 1.90366 | 31.31 |
| S6 | 386.170 | 0.20 | | |
| S7 | 38.151 | 3.80 | 1.90366 | 31.31 |
| S8 | 60.055 | 3.07 | | |
| S9 | 614.934 | 1.50 | 1.58144 | 40.89 |
| S10 | 27.082 | 8.43 | | |
| ST | infinity | 8.97 | | |
| S12 | −22.359 | 1.50 | 1.75211 | 25.05 |
| S13 | 92.861 | 9.68 | 1.88300 | 40.8 |
| S14 | −35.036 | 0.20 | | |
| S15 | 163.956 | 5.45 | 1.80610 | 40.73 |
| S16* | −61.423 | D1 | | |
| ASP: | | | | |
| K: −1.000 | | | | |
| A: 1.44905e−006 | B: −3.20985e−010 | C: 9.95240−013 | D: 0 | |
| S17 | −80.567 | 2.00 | 1.71736 | 29.5 |
| S18 | 185.027 | 4.50 | 1.83481 | 42.72 |
| S19 | −80.668 | 38.23 | | |
| Img | | | | |

Figure 2:
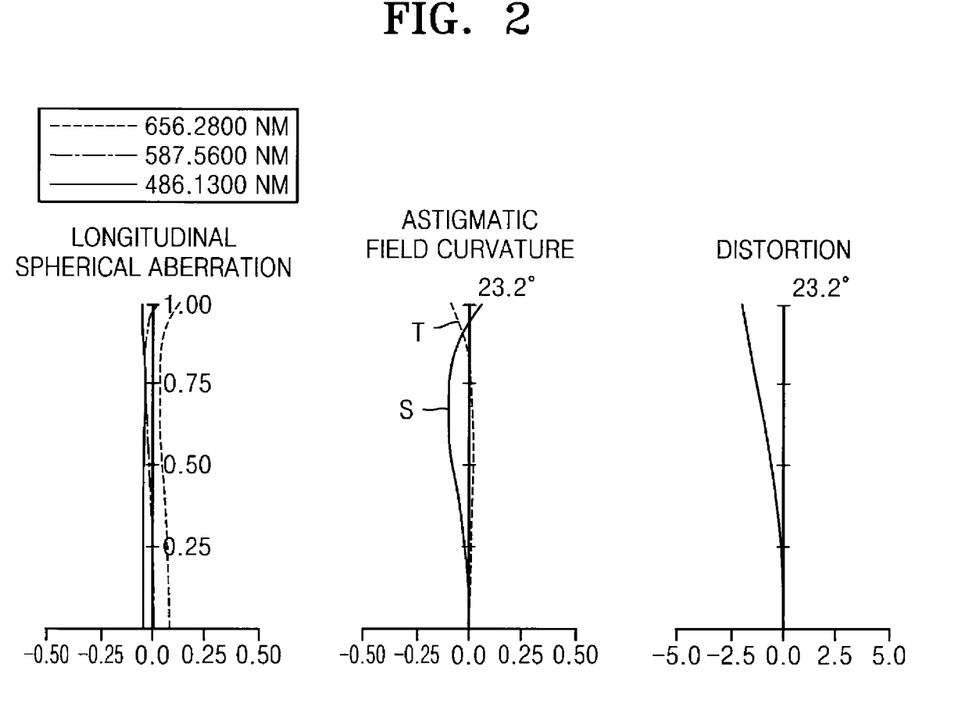
FIG. 2 illustrates aberration of the lens optical system according to the first embodiment of the present invention.

FIG. 2 illustrates longitudinal spherical aberration, astigmatic field curvature, and distortion of the lens optical system according to the first embodiment of the present invention. The longitudinal spherical aberration is illustrated as C-line and F-line based on Fraunhofer d-line, corresponding to the vertical axis of the graph. A tangential field curvature T and a sagittal field curvature S are illustrated as the astigmatic field curvature. In the graphs of the astigmatic field curvature and distortion, 23.2° represents a viewing angle.

Figure 3:
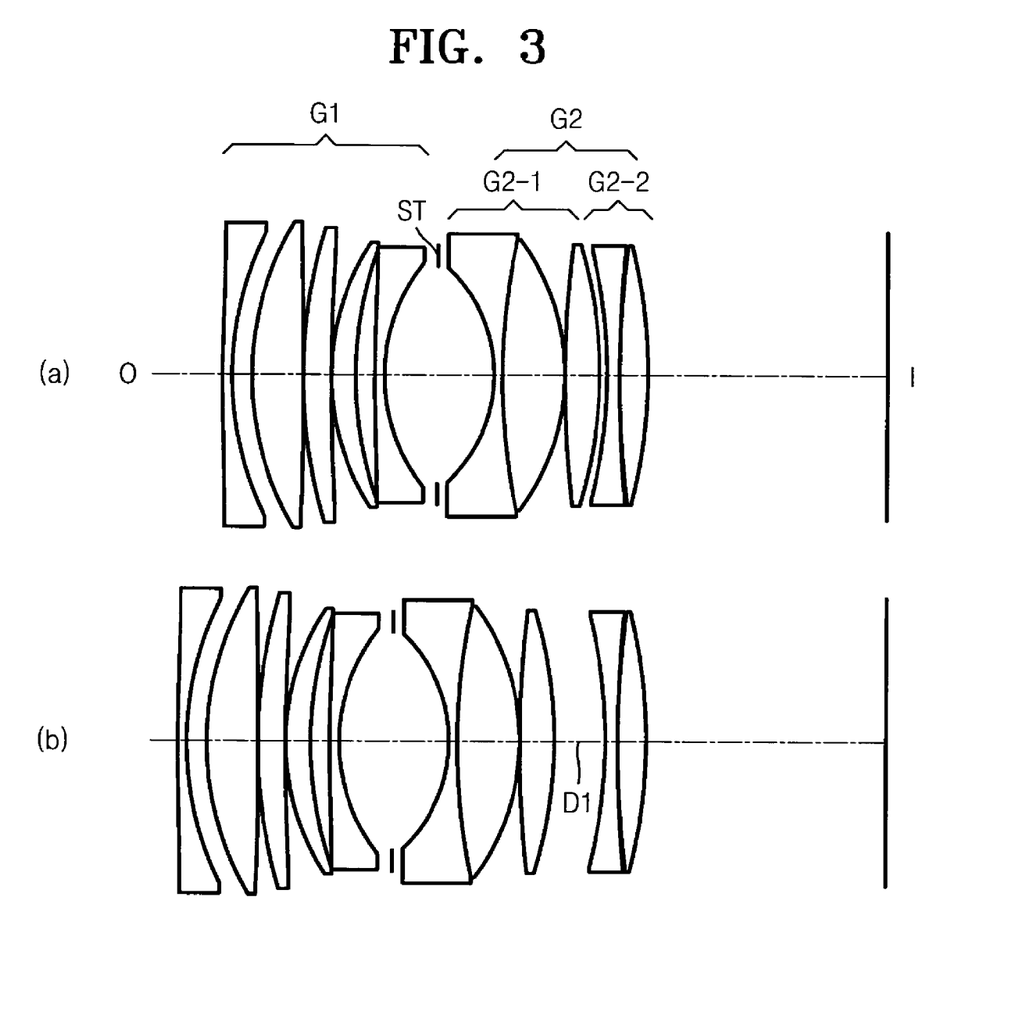

FIG. 3 illustrates a focusing operation of the lens optical system according to the first embodiment of the present invention. FIG. 3 illustrates an interval D1 between the front group G2-1 and the rear group G2-2 of the second lens group G2 while the focusing for correcting the image plane position is performed in accordance with a change in the distance from the object. According to the embodiments of the present invention, while the interval between the first lens group G1 having positive refractive power and the front group G2-1 of the second lens group G2 is fixed, the interval D1 between the front group G2-1 and the rear group G2-2 of the second lens group G2 is changed while focusing is performed. Table 1 shows the interval D1 with respect to the distance from the object while the focusing is performed.

TABLE 1

| Distance from object | Infinity | 45 cm |
|---|---|---|
| D1 | 1.30 | 8.07 |

Second Embodiment

FIG. 4 illustrates the lens optical system according to the second embodiment of the present invention.

f: 52.00 Fno; 1.25 2ω; 46.1°

| Lens side | R | Dn | Nd | Vd |
|---|---|---|---|---|
| S1 | 1000.00 | 1.50 | 1.80518 | 25.46 |
| S2 | 52.600 | 4.13 | | |
| S3 | 51.152 | 8.07 | 1.88300 | 40.8 |
| S4 | −183.251 | 0.30 | | |
| S5 | 36.410 | 5.03 | 1.88300 | 40.8 |
| S6 | 84.371 | 2.78 | | |
| S7 | −2090.951 | 1.50 | 1.56384 | 60.83 |
| S8 | 27.198 | 8.00 | | |
| ST | infinity | 12.42 | | |
| S10 | −26.457 | 1.50 | | |
| S11 | 47.952 | 8.82 | 1.88300 | 40.8 |
| S12* | −49.513 | 0.20 | | |

ASP:
K: −4.45356
A: 3.05419e−007   B: 8.26193e−010   C: −1.60775e−012   D: 0

| S13 | 1261.630 | 5.60 | 1.80610 | 40.73 |
| S14* | −43.372 | D1 | | |

ASP:
K: −1.000
A: −3.30636e−006   B: 3.09637e−009   C: −3.46198e−013   D: 0

| S15 | −350.361 | 1.50 | 1.75211 | 25.05 |
| S16 | 76.286 | 4.15 | 1.88300 | 40.8 |
| S17 | −242.638 | 38.06 | | |
| img | | | | |

Figure 5:
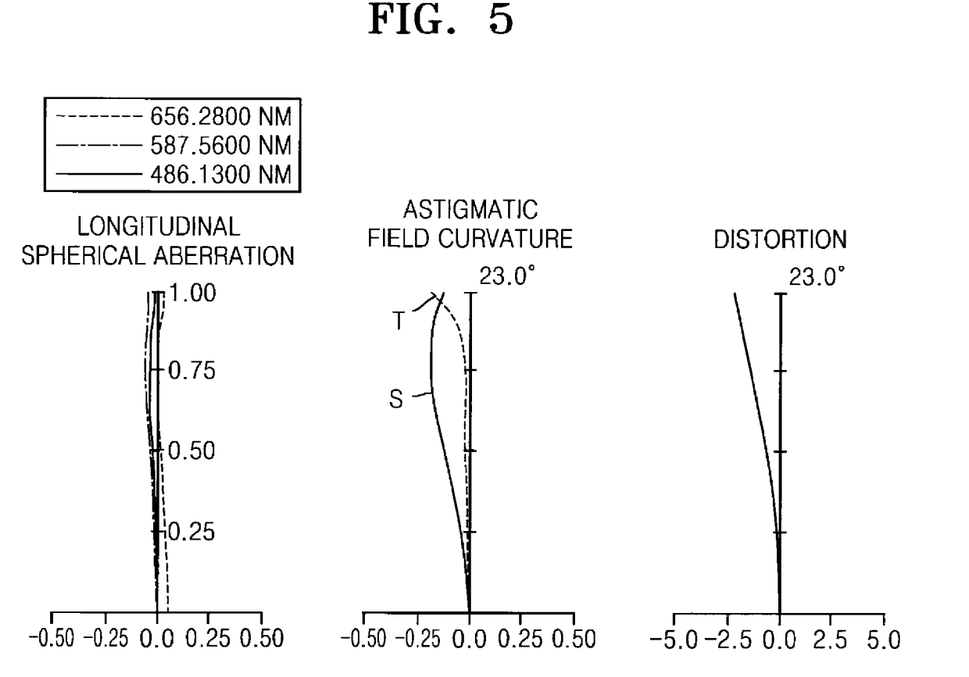
FIG. 5 illustrates aberration of the lens optical system according to the second embodiment of the present invention.

FIG. 5 illustrates longitudinal spherical aberration, astigmatic field curvature, and distortion of the lens optical system according to the second embodiment of the present invention. Table 2 shows D1.

TABLE 2

| Distance from object | Infinity | 45 cm |
|---|---|---|
| D1 | 1.26 | 9.19 |

Third Embodiment

FIG. 6 illustrates the lens optical system according to the third embodiment of the present invention.

f: 59.16 Fno; 1.35 2ω; 40.4°

| Lens side | R | Dn | Nd | Vd |
|---|---|---|---|---|
| S1 | 149.855 | 1.50 | 1.80518 | 25.46 |
| S2 | 46.202 | 1.13 | | |
| S3 | 42.436 | 7.53 | 1.88300 | 40.8 |
| S4 | −2000.000 | 0.43 | | |
| S5 | 35.879 | 5.73 | 1.83400 | 37.34 |
| S6 | 71.968 | 3.44 | | |
| S7 | 334.305 | 2.40 | 1.55115 | 49.52 |
| S8 | 25.266 | 7.97 | | |
| ST | infinity | 11.19 | | |
| S10 | −25.396 | 1.67 | | |
| S11 | 51.309 | 11.60 | 1.88300 | 40.8 |
| S12 | −53.582 | 0.22 | | |
| S13 | 169.723 | 4.73 | 1.80610 | 40.73 |
| S14* | −54.377 | D1 | | |

ASP:
K: −1.000
A: 1.301053e−006   B: 2.435146e−010   C: 2.334887e−013   D: 0

| S17 | 386.704 | 3.01 | 1.83481 | 42.72 |
| S18 | −1000.000 | 38.36 | | |
| img | | | | |

Figure 7:
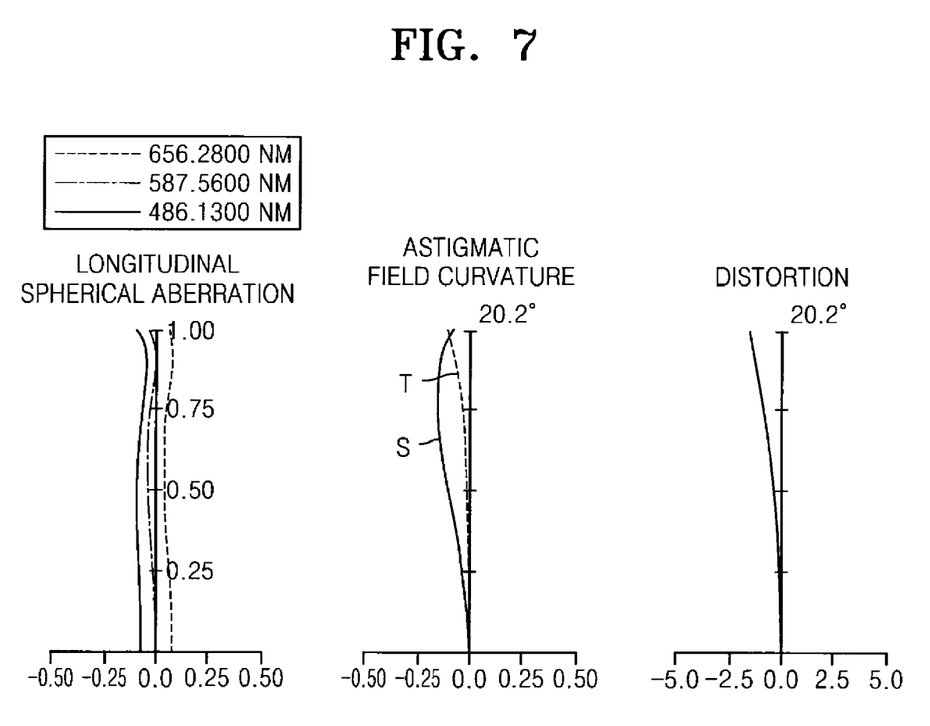
FIG. 7 illustrates aberration of the lens optical system according to the third embodiment of the present invention.

FIG. 7 illustrates longitudinal spherical aberration, astigmatic field curvature, and distortion of the lens optical system according to the third embodiment of the present invention. Table 3 shows D1.

TABLE 3

| Distance from object | Infinity | 45 cm |
|---|---|---|
| D1 | 1.20 | 10.5 |

Table 4 below shows that the lens optical systems according to the first to third embodiments satisfy the conditions of Inequalities 1, 2, and 3.

TABLE 4

| | First embodiment | Second embodiment | Third embodiment |
|---|---|---|---|
| Inequality 1 | 1.34 | 1.37 | 1.54 |
| Inequality 2 | 1.90 | 1.88 | 1.88 |
| Inequality 3 | 8.07 | 6.01 | 5.61 |

The lens optical systems according to embodiments of the present invention may be applied to not only film cameras but also digital single reflex cameras employing an image sensor such as a charge coupled device (CCD). The lens optical systems may also be used in a large aperture short focus lens having a viewing angle of 40 to 50 degrees and an aperture ratio equal to or less than 1:1.5.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lens optical system comprising, in a sequence from an object side to an image side, a first lens group having positive refractive power, a stop, and a second lens group having positive refractive power,
  wherein the first lens group comprises a plurality of lenses among which a lens closest to the object side and a lens closest to the stop have negative refractive powers, and
  the second lens group comprises a front group comprising, in a sequence from the object side to the image side, a lens having negative refractive power and a plurality of lenses having positive refractive powers; and a rear group comprising at least one lens close to the image side.

2. The lens optical system of claim 1, satisfying the following inequality:

$$1.2 < \frac{f_{all}}{b.f} < 1.6$$

wherein $f_{all}$ denotes an overall focal distance of the lens optical system, and b.f denotes a back focal distance when the distance from the object is infinity.

3. The lens optical system of claim 2, wherein the interval between the front group and the rear group of the second lens group is changed while focusing is performed in accordance with a change in the distance from the object.

4. The lens optical system of claim 2, wherein the rear group of the second lens group is fixed with respect to the image side while focusing is performed.

5. The lens optical system of claim 1, wherein the lens closest to the object side and the lens closest to the image side of the first lens group have negative refractive power, and at least two lenses having positive refractive power are arranged between the lens closest to the object side and the lens closest to the image side of the first lens group,
  wherein at least one of the two lenses having positive refractive powers satisfies the following inequality:

$$1.80 < NGr1$$

wherein NGr1 denotes a refractive index of a lens having positive refractive power in the first lens group based on a d-line.

6. The lens optical system of claim 1, wherein an interval between the front group and the rear group of the second lens group is changed while focusing is performed in accordance with a change in the distance from the object.

7. The lens optical system of claim 6, wherein the rear group of the second lens group is fixed with respect to the image side while focusing is performed.

8. The lens optical system of claim 1, wherein the interval between the first lens group and the front group of the second lens group is fixed while focusing is performed.

9. The lens optical system of claim 1, wherein the rear group of the second lens group satisfies the following inequality:

$$1 < \frac{f_{2-2}}{f_{all}} < 10$$

wherein $f_{2-2}$ denotes a combined focal distance of the rear group of the second lens group, and $f_{all}$ denotes an overall focal distance of the lens optical system.

10. The lens optical system of claim 1, wherein the front group of the second lens group comprises at least one aspherical surface.

11. The lens optical system of claim 1, wherein the rear group of the second lens group has positive refractive power.

12. The lens optical system of claim 1, having an aperture ratio equal to or less than 1:1.5.

13. The lens optical system of claim 1, wherein the first lens group comprises 5 or less lenses.

* * * * *